No. 606,767. Patented July 5, 1898.
D. L. ROSE.
SPEED MEASURER.
(Application filed Sept. 18, 1897.)
(No Model.) 2 Sheets—Sheet 1.

Witnesses
F. L. Ourand
E. P. Caverly

Inventor
D. L. Rose
By R. A. Morrison
Attorney

No. 606,767. Patented July 5, 1898.
D. L. ROSE.
SPEED MEASURER.
(Application filed Sept. 18, 1897.)
(No Model.) 2 Sheets—Sheet 2.
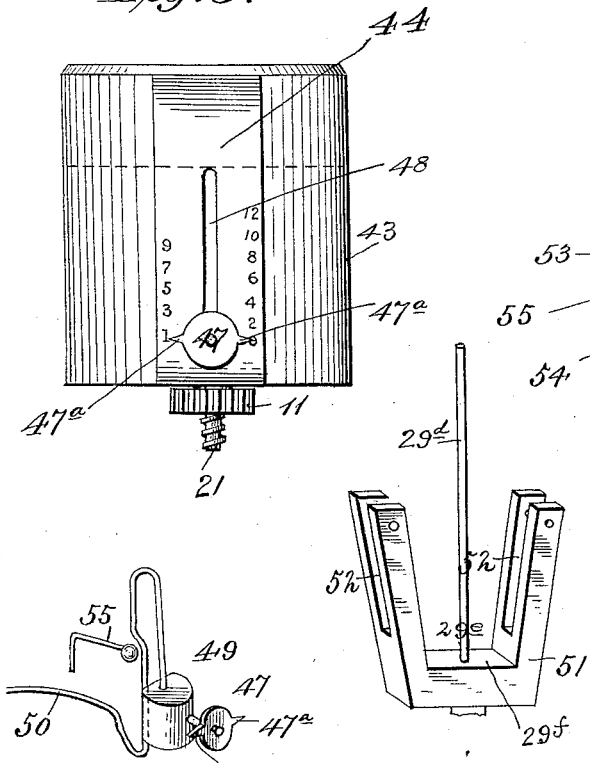
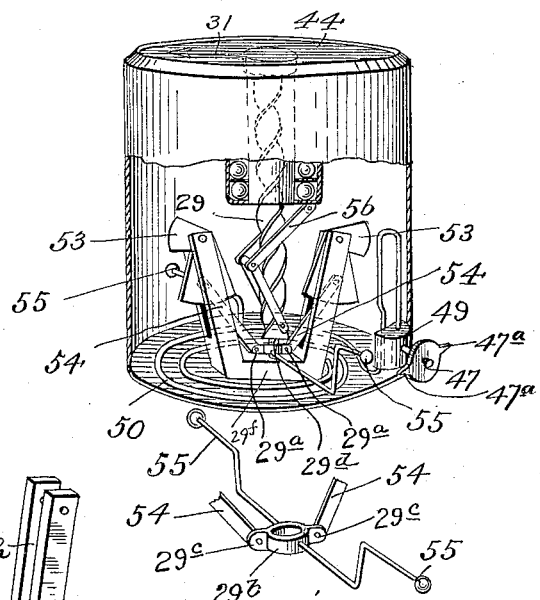
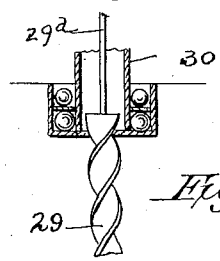
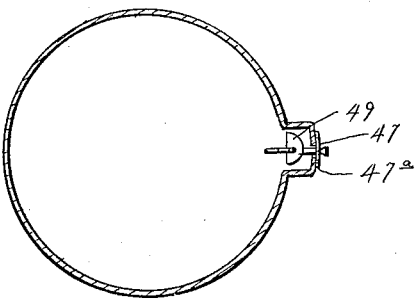
Witnesses
Inventor
D. L. Rose
By R. A. Morrison.
Attorney
THE NORRIS PETERS CO., PHOTO-LITHO., WASHINGTON, D. C.

UNITED STATES PATENT OFFICE.

DICKINSON LOGAN ROSE, OF MANKATO, MINNESOTA.

SPEED-MEASURER.

SPECIFICATION forming part of Letters Patent No. 606,767, dated July 5, 1898.

Application filed September 18, 1897. Serial No. 652,203. (No model.)

*To all whom it may concern:*

Be it known that I, DICKINSON LOGAN ROSE, a citizen of the United States, residing at Mankato, in the county of Blue Earth and State of Minnesota, have invented certain new and useful Improvements in Attachments for Bicycles or other Vehicles; and I do hereby declare the following to be a full, clear, and exact description of the invention, such as will enable others skilled in the art to which it appertains to make and use the same, reference being had to the accompanying drawings, with numerals of reference marked thereon, which form a part of this specification.

This invention relates to improvements in attachments for bicycles or vehicles of any sort, and its purpose is to enable the rider to ascertain at any time the speed at which he is traveling and the distance traveled from any designated place or for any length of time and to cause a bell to ring when any predetermined speed has been attained. In most large cities and probably many smaller ones the rider is liable to be fined in case he exceeds the rate of speed allowed by law. It is very difficult to determine the exact speed at which the rider is traveling, and generally it is the result of conjecture or the mere opinion of the observer; but where a bell or gong or any other instrument of sound will strike an alarm when the highest speed allowed is attained the question is one of easy and accurate settlement.

I attain the foregoing and other desirable objects by means of the devices illustrated in the accompanying drawings and hereinafter fully described and claimed.

Figure 1:
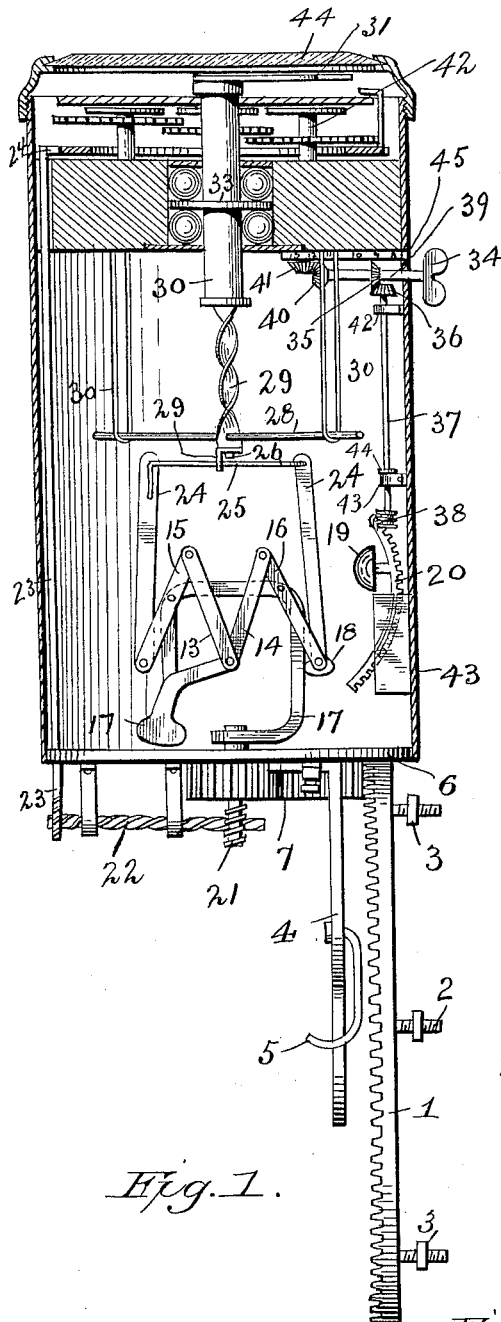
Figure 2:
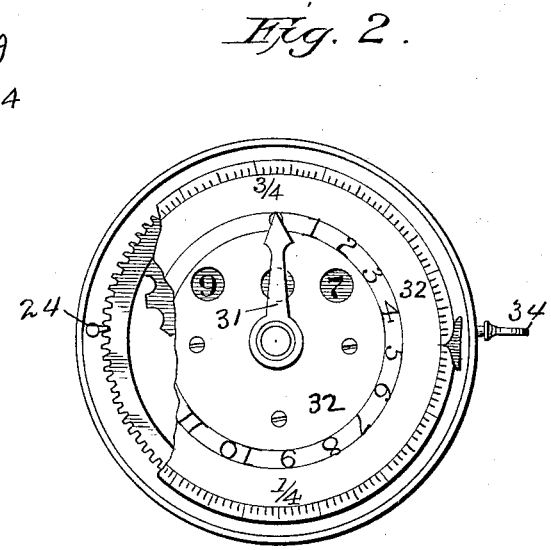
Figure 3:
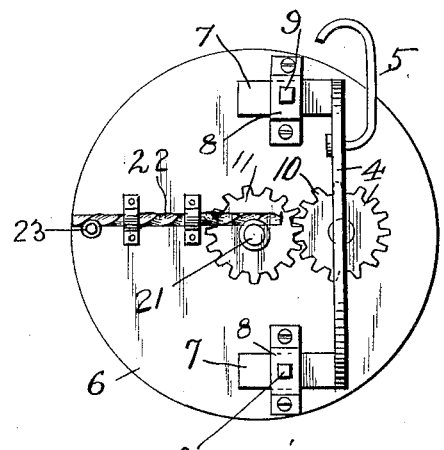
Figure 4:
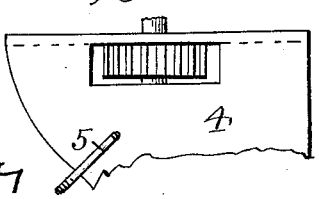

Figure 1 is a side elevation, partly in section. Fig. 2 is a plan view. Fig. 3 is a bottom view, and Fig. 4 a detailed side elevation, of the support. Fig. 5 is a side elevation, showing the slot and set-screw for adjusting the weight to which the gong is attached, of another form of my invention shown in Fig. 6. Fig. 6 is a perspective, partly broken away, of another form of my invention. Fig. 7 is a detail perspective of the weight or support to which the gong is attached. Fig. 8 is a detail perspective of the support for the weights and levers shown in Fig. 6. Fig. 9 is a perspective of the striking mechanism, and Fig. 10 is a detail section of the spiral and guide-rod for the same. Fig. 11 is a detail in cross-section, showing the form of the casing and hood, with the block 49 located in said hood.

1 represents a toothed-face wheel slipped onto the hub of a bicycle and attached to the bicycle-wheel by means of screw-bolts 2 and nuts 3.

4 is a plate which supports casing 43, which incloses the special operative devices of my improvements. This plate is slipped onto the axle of the wheel. It carries a link 5, which is attached to the front fork of the bicycle. This supporting-plate is secured to the bottom 6 of the casing 43 by means of flanges 7, which take into brackets 8, secured to the bottom 6 by screws or in any other suitable way. It will be seen that by this construction the supporting-plate is adjustable and can be made to fit wheels of different sizes and constructions. It is held in its adjusted position by means of the set-screws 9.

The face-wheel 1 meshes with the gear-wheel 10, which in turn engages the gear-wheel 11, whose shaft extends upward through the bottom of the casing and to the inner end of which is rigidly attached the frame 17, which carries a series of levers 13, 14, 15, and 16, the levers 14 and 16 having regulating-weights 17 and 18, the latter of which operates as a striker to a bell or gong or other sounding device 19, carried on a toothed segmental rack 20. These levers are pivotally connected, as shown in Fig. 1, and to the lower ends of levers 15 and 16 bars 24 are pivoted, for a purpose hereinafter set forth. The end of the shaft carrying the gear-wheel 11 terminates in a spiral 21, adapted to coöperate with a horizontal spiral 22, which in turn engages the lower spiral end of a vertical rod 23, carrying a single cog 24 on its upper end, which operates the cyclometer-wheel, as seen in Fig. 2. A cross-bar 25, or a pivot only, unites the upper ends of the bars 24', passing through a bracket 27, or the same pivot passed through said bracket. To this bracket is pivoted the spiral 29, as seen at 26. Through spiral 29 passes a horizontal rod 28, whose ends rest in loops or ways 30' and work up and down in said loops or hangers as the spiral 29 is elevated or depressed. This spiral works in a sleeve 30, which has corresponding threads and which carries an indicator 31, located on the upper end of the sleeve, as seen in Figs. 1 and 2. The cyclometer-plate 32 has on its upper face a dial with numbers marked thereon to indicate the rate of speed at which the cycle is traveling by the pointer 31. If desired, the face can be divided into any number of subdivisions to indicate exactly the rate of speed. The indicator-hand 31 is of less diameter than is the face of the cyclometer, so as not in the least to interfere with the function of that instrument. The cyclometer is of the usual form and construction, and no detailed description of it is necessary. It only differs from those bought in the market by dispensing with the usual five-toothed wheel, and is operated by the rod 23, having a single tooth 24, as has been stated. It will be noticed that the sleeve 30 carries a circular plate 33, located between the ball-bearings to lessen friction in the working of the sleeve 30 and also to prevent it from being pushed up or depressed when the spiral is in motion. Any other well-known means for reducing friction may be employed. It will be observed that the bell or gong or sounding device is carried by a segmental rack-bar 20. The bell is adjusted to any desired position by means of the thumb-screw 34, working the horizontal rod 39, which carries a beveled gear 35, engaging another bevel-gear 36 on the upper end of a vertical rod 37, the lower end of said rod being provided with worm 38, which engages with the rack 20. The rod 37 is held in place by brackets 42, being provided with a collar 44, which rests on brackets 43, and thereby supports said rod in position. The inner end of rod 39 carries a bevel-gear 40, which meshes with bevel-gear 41, attached to a gear on the lower end of vertical rod 42, which engages with a gear on a dial 45, viewed through aperture in the side of the casing 43. By these means the bell can be set to be rung at any desired rate of speed. The weight 18 serves not only to regulate and steady the action of the system of levers, but also serves as a striker for the bell.

While I have shown my improvements as particularly applied to a bicycle, I wish it understood that I do not limit myself to such application. They may be applied to any moving vehicle or any device that has motion. It can be easily adjusted to use on a vessel also. A miniature turbine wheel in the water would supply the motion, and the appliance itself could be placed in any part of the vessel, as might be desired. Also the system of levers may be differently arranged without departing from the scope of my invention. For example, another form of my invention is shown in Figs. 5 and 6. In this example the frame supporting the weights and levers has a base 29$^b$ and nearly vertical slotted arms having weights 53 pivoted at their upper ends. To the lower part of each of these weights is pivoted one end, respectively, of links 54, the other end of the links being pivoted to ears 29$^c$ of a collar 29$^b$. Through this collar extends a pin 29$^d$, whose lower end is rigidly attached to the base of the frame 51 at 29$^e$ and extends up through the spiral 29 and sleeve 30, as seen in Fig. 10. This rigid pin guarantees all motion of the spiral to be true and exact, thereby preventing any wavering of the index-hand. Levers or links 56 form a toggle-joint and have their upper ends pivoted to the ball-bearing case and their lower ends to the spiral 29. These levers prevent the spiral from turning, performing the same function as do the rod 28 and ways 30 in Fig. 1. To the collar 29$^b$ are attached strikers 55, which come in contact with the gong or sounding-wire 50, which is attached to a metal block 49, one end of wire 50 being attached thereto. The case has a hood 56, in which is a slot 48, Fig. 5, with graduated sides in order that the gong may be set to ring at any predetermined rate of speed and kept ringing until the speed is slackened.

It is desirable that the mechanism should be compact and occupy the least possible space. For this reason the case is provided with a hood, as shown in Figs. 5 and 6, in which is located the block 49, which carries the sounder. By this construction the case proper can be made much smaller and is therefore more sightly and less in the way. The metal block 49 is located in this hood. This adjustment is made by the set-screw 47, which has pointers 47$^a$ to indicate at what rate of speed it is set to ring. When motion is given to the frame 51, the lower parts of the weights 53 will be thrown outward, thereby elevating the spiral 29 and operating the indicator 31. The strikers will contact with the wire 50 when the speed has been attained which the fingers 47$^a$ indicate, and the gong will continue to ring as long as that speed or a greater is maintained.

In the form of my invention shown in Fig. 1 the alarm will be struck at the desired time, but the ring will not be continuous. In the form shown more fully in Fig. 6 the ringing will be continuous until the speed is slackened. In this form also the case is of less height, since the spiral rests on the base of the frame and works upward from that point.

I do not limit myself to the precise arrangement of the operative parts of my device, as many other arrangements of the parts will fall within the scope and spirit of my invention.

The operation of my device is as follows: The face-wheel 1 will receive motion from the bicycle-wheel, and through the mediation of the gears 10 and 11 this motion will be transferred to frame 17. As this frame revolves centrifugal force will expand the levers, elevate rods 24, which in turn will force upward the spiral 29, thereby turning sleeve 30, which carries the indicating-finger 31. When the levers have expanded to any predetermined point, according to the adjustment of the bell mechanism, the weight 18 will come in contact with the bell 19, and thereby sound the alarm. Also by the revolution of the cog-wheel 11, which is rigid on its shaft, the worm 21 will receive motion, thereby operating the worm 22, which in turn operates the rod 23, turning the cyclometer-wheel one notch at every revolution.

43 is a casing inclosing my special operative mechanism and is provided with a glass top 44 and an aperture 45, through which the numbers designed to indicate the rate of speed which shall sound the alarm may be seen.

The operation of the other form of my invention more fully shown in Figs. 5 and 6 is identical with that shown in Fig. 1 and does not, therefore, require a detailed description of the same.

What I claim, and desire to secure by Letters Patent, is—

1. A speed-indicator and cyclometer having a common dial-plate, an interiorly spirally threaded sleeve provided with a pointer and having a midway plate, ball-bearings above and below said plate, and means to operate said sleeve, all combined as set forth.

2. A speed-indicator and cyclometer having a common dial-plate, an interiorly spirally threaded sleeve provided with a pointer and having a midway plate, ball-bearings above and below said plate, a spiral working in said sleeve and carrying means to prevent its turning, and means to operate said sleeve, all combined and arranged as set forth.

3. A speed-indicator and cyclometer having a common dial-plate, an interiorly spirally threaded sleeve having a pointer and a midway plate, ball-bearings above and below said plate, a spiral working in said sleeve and carrying means to prevent its turning, a vertical rod having a single tooth, a cyclometer-wheel coöperating therewith, and devices connecting said rod and spiral with a face-wheel, whereby all the parts are operated by said wheel, all combined as set forth.

4. A cyclometer-wheel, a vertical rod having a single cog engaging said wheel, said rod terminating in a spiral, a worm-gear engaging the spiral and devices operating the worm-gear connected to the face-wheel and operated thereby, all arranged as set forth.

5. In a speed-indicator, a device carrying a sounder, means to adjust said device, a shaft provided with a pinion, a frame having bifurcated arms and supported by said shaft and carrying a collar having a series of levers and a series of strikers, said levers operating in the bifurcated arms with the strikers outside of said arms and means to operate the same, all arranged as set forth.

6. A casing provided with a slotted hood, a sounder having a support located in said hood, a set-screw working in said slot and carrying pointers and means to operate the sounder, all arranged as set forth.

7. A casing having a slotted hood, a revolving frame carrying strikers, a sounder consisting of a coiled spring surrounding said frame having one end attached to a support located in said hood.

8. A casing having a slotted hood, a revolving frame carrying striker-arms, a sounder consisting of a coiled spring encircling said frame having one end attached to an adjustable support located in said hood, a set-screw working in said slot and carrying pointers whereby said support may be adjusted to any height, as set forth.

In testimony whereof I affix my signature in presence of two witnesses.

DICKINSON LOGAN ROSE.

Witnesses:
 JNO. C. NOE,
 W. M. TAYLOR.